United States Patent
Chang et al.

(10) Patent No.: US 6,529,491 B1
(45) Date of Patent: Mar. 4, 2003

(54) PRIVATE/RESIDENTIAL CODE DIVISION MULTIPLE ACCESS WIRELESS COMMUNICATION SYSTEM

(75) Inventors: Kim Chang, Richardson, TX (US); Ibrahim Ghaleb, Dallas, TX (US); Huang Chenhong, Plano, TX (US)

(73) Assignee: Nortel Networks Ltd., St. Laurent (CA)

(*) Notice: Subject to any disclaimer, the term of this patent is extended or adjusted under 35 U.S.C. 154(b) by 0 days.

(21) Appl. No.: 09/186,534

(22) Filed: Nov. 5, 1998

Related U.S. Application Data (60) Provisional application No. 60/064,868, filed on Nov. 5, 1997.

(51) Int. Cl.[7] .............................................. H04B 7/216
(52) U.S. Cl. ............................................ 370/335; 455/403
(58) Field of Search .................................. 370/335, 342, 370/336, 203, 252, 229, 441, 515, 310, 320, 328, 479; 455/403, 426, 447

(56) References Cited

U.S. PATENT DOCUMENTS

| | | | | |
|---|---|---|---|---|
| 5,295,180 A | * | 3/1994 | Vendetti et al. | 455/435 |
| 5,548,809 A | * | 8/1996 | Lemson | 455/454 |
| 5,574,971 A | * | 11/1996 | Aihara | 455/441 |
| 5,642,398 A | * | 6/1997 | Tiedemann et al. | 455/426 |
| 5,794,153 A | * | 8/1998 | Ariyavisitakul et al. | 455/507 |
| 5,924,036 A | * | 7/1999 | Gustafson | 455/447 |
| 6,088,598 A | * | 7/2000 | Marsolais | 455/414 |
| 6,101,176 A | * | 8/2000 | Honkasalo et al. | 370/335 |
| 6,111,538 A | * | 8/2000 | Schuchman et al. | 342/357.12 |
| 6,115,608 A | * | 9/2000 | Duran et al. | 455/436 |
| 6,205,132 B1 | * | 3/2001 | Hong et al. | 370/342 |
| 6,243,577 B1 | * | 6/2001 | Elrefaie et al. | 455/426 |
| 6,327,245 B1 | * | 12/2001 | Satyanarayana et al. | 370/229 |
| 6,370,157 B2 | * | 4/2002 | Boccuzzi et al. | 370/482 |

\* cited by examiner

*Primary Examiner*—Douglas Olms
*Assistant Examiner*—Brian Nguyen
(74) *Attorney, Agent, or Firm*—Bruce Garlick (57) ABSTRACT

The private/residential wireless communication system uses the code division multiple access air interface to provide communication with radiotelephones. The present invention provides support for both physical and virtual private systems. A radiotelephone monitors the broadcast channel of the public system to obtain private system information. The radiotelephone use the broadcast information together with pre-programmed stored private system information in the radiotelephone memory to acquire and register with the private systems. If the radiotelephone locates a private system that is not stored in its memory, it obtains relevant information for registering with that system. The radiotelephone then stores the information of accepting systems. This information is displayed so that a system can be chosen. The radiotelephone then registers with the chosen system.

15 Claims, 8 Drawing Sheets

| Overlaying System Table (OST) | | | | | | |
|---|---|---|---|---|---|---|
| | SID | NID | BASDE_ID | BS LAT/LONG | BAND CLASS | Frequ-ency | Pointer to PST |
| 1 | SID1 | NID1 | BASE_ID1 | LAT1/LONG1 | B | F2 | 00001 |
| 2 | SID1 | NID1 | BASE_ID2 | LAT2/LONG2 | B | F2 | 00010 |
| 3 | SID2 | NID2 | BASE_ID3 | LAT3/LONG3 | C | F3 | 00011 |

Figure 4A

| PRIVATE SYSTEM TABLE (PST) | | | | |
|---|---|---|---|---|
| Index | BAND CLASS | Frequency | Pilot-PN | Location Info |
| 00001 | B | F4 | PN-20 | (LAT1/LONG1/RAD1) |
| | | | PN-100 | |
| 00010 | B | F4 | PN-200 | (LAT1/LONG1/RAD1) |
| 00011 | C | F5 | PN-110 | (LAT1/LONG1/RAD1) |

Figure 4B

| SYSTEM IDENTIFICATION TABLE (SIT) | | |
|---|---|---|
| 1 | UZID1 | Alpha Tag 1 |
| 2 | UZID2 | Alpha Tag 2 |
| 3 | UZID3 | Alpha Tag 3 |
| 4 | UZID4 | Alpha Tag 4 |
| 5 | UZID5 | Alpha Tag 5 |

PRIVATE/RESIDENTIAL CODE DIVISION MULTIPLE ACCESS WIRELESS COMMUNICATION SYSTEM

RELATED APPLICATIONS

This application claims the benefit of U.S. Provisional Application No. 60/064,868, filed Nov. 5, 1997.

BACKGROUND OF THE INVENTION

I. Field of the Invention

The present invention relates to radio communications. More particularly, the present invention relates to a private code division multiple access (CDMA) wireless communications system as well as CDMA Tiered Service capability.

II. Description of the Related Art

Multiple access modulation techniques are efficient techniques for utilizing the limited radio frequency spectrum. Examples of such techniques include time division multiple access (TDMA), frequency division multiple access (FDMA), and code division multiple access (CDMA).

CDMA modulation employs a spread spectrum technique for the transmission of information. A spread spectrum system uses a modulation technique that spreads the transmitted signal over a wide frequency band. This frequency band is typically substantially wider than the minimum bandwidth required to transmit the signal.

A form of frequency diversity is obtained by spreading the transmitted signal over a wide frequency range. Since only part of a signal is typically affected by a frequency selective fade, the remaining spectrum of the transmitted signal is unaffected. A receiver that receives the spread spectrum signal, therefore, is affected less by the fade condition than a receiver using other types of signals.

The spread spectrum technique is accomplished by modulating each base band data signal to be transmitted with a unique wide band spreading code. Using this technique, a signal having a bandwidth of only a few kilohertz can be spread over a bandwidth of more than a megahertz. Typical examples of spread spectrum techniques are found in M. K. Simon, Spread Spectrum Communications, Volume I, pp. 262–358.

In a CDMA-type wireless communication system, multiple signals are transmitted simultaneously at the same frequency. A particular receiver then determines which signal is intended for that receiver by a unique spreading code in each signal. The signals at that frequency, without the particular spreading code intended for that particular receiver, appear to be noise to that receiver and are ignored.

The present CDMA air interface, however, is not well suited to private systems. A private system that uses the public CDMA carrier is required to provide soft hand-off support to public users in its coverage area to avoid RF interference issues. The reason is that when a radiotelephone, operating on the macro public system, moves closer to the private micro-cell, it creates interference to the micro-cell users. It is thus imperative for the private micro-cell to be able to control the power of that radiotelephone (i.e. support of hand-off); otherwise, interference becomes so strong that it makes the private micro-cell inoperative.

In a single carrier deployment, therefore, RF interference limits the feasibility of private home and office CDMA systems. There is a resulting unforeseen need for a private wireless communication system using a CDMA air interface. As a result it is almost impossible for CDMA systems to support private systems on the same RF carrier frequency as the overlaying public system. Furthermore, service providers cannot have geographic granularity of billing and other services for a region that is smaller than a natural CDMA cell or sector. There is accordingly a need for a new scheme to provide the capability of a private/residential system services, as well as tiered services in CDMA wireless communication systems.

SUMMARY

The present invention encompasses a private/residential wireless communication system that uses a code division multiple access air interface. The private system is overlaid by a public CDMA system. The public CDMA system comprises an antenna coupled to a base station. The private system may operate on a predetermined frequency, or it may share the same radio resources with the overlaying public system. The private system may be assigned a predetermined identification (for example User Zone identification UZID). When the private system operates on a different frequency than the overlaying public system, the private system may be assigned one (or more) predetermined User Zone(s) identification.

In certain embodiments, the public base station broadcasts the predetermined identification over a channel for reception by a radiotelephone. This instructs the radiotelephone as to what private systems are being served by the public system.

In alternate embodiments, the public system also broadcasts frequency, band class, pseudorandom noise offset information, and geographical location information regarding the private systems that are served by the public system. If the radiotelephone has the ability to determine its geographic location, it can find the private systems by using the broadcast geographic information.

In alternate embodiments, the private system is autonomous to the public system and no information regarding the private system is broadcast by the public system.

DETAILED DESCRIPTION OF THE PREFERRED EMBODIMENT

The present invention provides private, semiprivate, and residential system capability using a CDMA air interface. The present invention also provides tiered service capability in CDMA systems. Tiered service provides the operator with the ability to use existing networks to offer custom services to one or more subscribers based on their geographic location. A radiotelephone operating in such a system is provided one-number, seamless communication in any environment having the infrastructure.

The present invention provides the support of both physical private systems and virtual private systems. A physical private system operates on a different carrier frequency than the overlaying public system using independent radio resources. A virtual private system operates on the same carrier frequency of the overlaying public system. In this case, the virtual private system users share the same resources with the public user, however are offered customized services.

Subsequent discussions refer to the communications device as a radiotelephone. The present invention is not limited to a radiotelephone but can include any wireless communication device such as a computer with wireless communication capability.

The communication system of the present invention implements User Zones to provide seamless communication between different types of systems and to support both physical and virtual private systems. The User Zones are a customer subscription option offered to a select group of users. A specific User Zone is associated with a set of features and/or services plus a geographic area in which the User Zone features/services are made available to the customers that have subscribed to that particular User Zone.

The boundary of the geographic area of the User Zone may be established based on the coverage area of a public or private base station or it may be established independent of RF topology. In the latter embodiment, a process for the radiotelephone to determine its location, such as using the global positioning system (GPS) or triangulation, is employed to determine if it is operating within a particular User Zone. Alternate embodiments use other methods for determining if the radiotelephone is operating in a particular User Zone. These include, but are not limited to, the radiotelephone user inputting the location information and using time of arrival of signals.

An example of a User Zone is a department store. The boundaries of the User Zone would be the department store building and the immediate area surrounding the store. The store can then transmit the latest sale information to shoppers. Additionally, the store management can use the User Zone to communicate with its employees who are equipped with radiotelephones.

Another example will be a private campus. If the user stays in the area covered by the User Zone, then he may get a set of features and services such as 4-digits PBX-type dialing. Furthermore, the user may be billed at a flat rate on a monthly basis independent of the actual usage of the radiotelephone.

The User Zones of the present invention can be supported in various ways. One embodiment defines User Zones that operate on private radio equipment that is separate from the radios of the public serving base station but still supported by the public base station. User Zones of this embodiment are listed on the broadcast public paging channel neighbor lists and are subsequently referred to as non-autonomous private User Zones.

Another embodiment defines User Zones that operate on private radio equipment not supported by the public base station. User Zones of this embodiment are not listed on the broadcast public paging channel neighbor lists and are subsequently referred to as autonomous private User Zones.

Still another embodiment defines User Zones that shares the radio resources with the public system. The User Zones of this last embodiment are subsequently referred to as virtual User Zones. The broadcast public paging channel broadcasts the User Zones identification (UZID) of the virtual private User Zones.

In certain embodiments, to identify a User Zone, the network's base station transmitter broadcasts User Zone information. This information varies depending on the embodiment. In the case of virtual private User Zones, the User Zone information can include the User Zone identification numbers (UZID) of the User Zones that are supported by the serving base station. In the case of non-autonomous private User Zones, the User Zone information may include: the band class and frequency on which the private system supporting a particular User Zone operates, as well as the pseudorandom noise (PN) offset of the associated pilot. In addition, the User Zone information may include User Zone boundary specification parameters, for example the latitude and longitude coordinates of the center of each User Zone in the network, and the radius of each User Zone. In the preferred embodiment, the User Zone information is transmitted on the paging channel of the serving base station. Alternate embodiments may use other channels to transmit the information.

After the radiotelephone receives the broadcast User Zone information, the radiotelephone needs to determine if it is in one of the User Zones to which it has subscribed for service. In subsequent access back to the system, the radiotelephone, in addition to normal operational procedures, needs to identify its User Zone to the system.

Furthermore, based on the received User zone information, the radiotelephone can query the system on whether it can subscribe to certain User Zones, unknown to the radiotelephone, that are broadcast by the serving base station. In response to the query, the base station identifies to the radiotelephones the User Zones accepting subscription and registration. The serving base station also sends all the associated information necessary for the radiotelephone to get service from a particular User Zone.

In the preferred embodiment, the radiotelephone retains accepted User Zone ID information in memory through a power cycle. In other words, once the radiotelephone is powered down, the information is lost. In alternate embodiments, the information can be retained in non-volatile memory for future use. This non-volatile memory includes removable memory cards as well as memory internal to the radiotelephone.

In subsequent discussions of wireless communication systems of the present invention, each example shows one or two User Zones. This is for illustration purposes only. Additionally, the following embodiments discuss particular frequencies, PN offsets, band classes, latitudes/longitudes, and radiuses of private systems. These are also for illustration purposes only and do not limit the invention to the values discussed.

Figure 1:
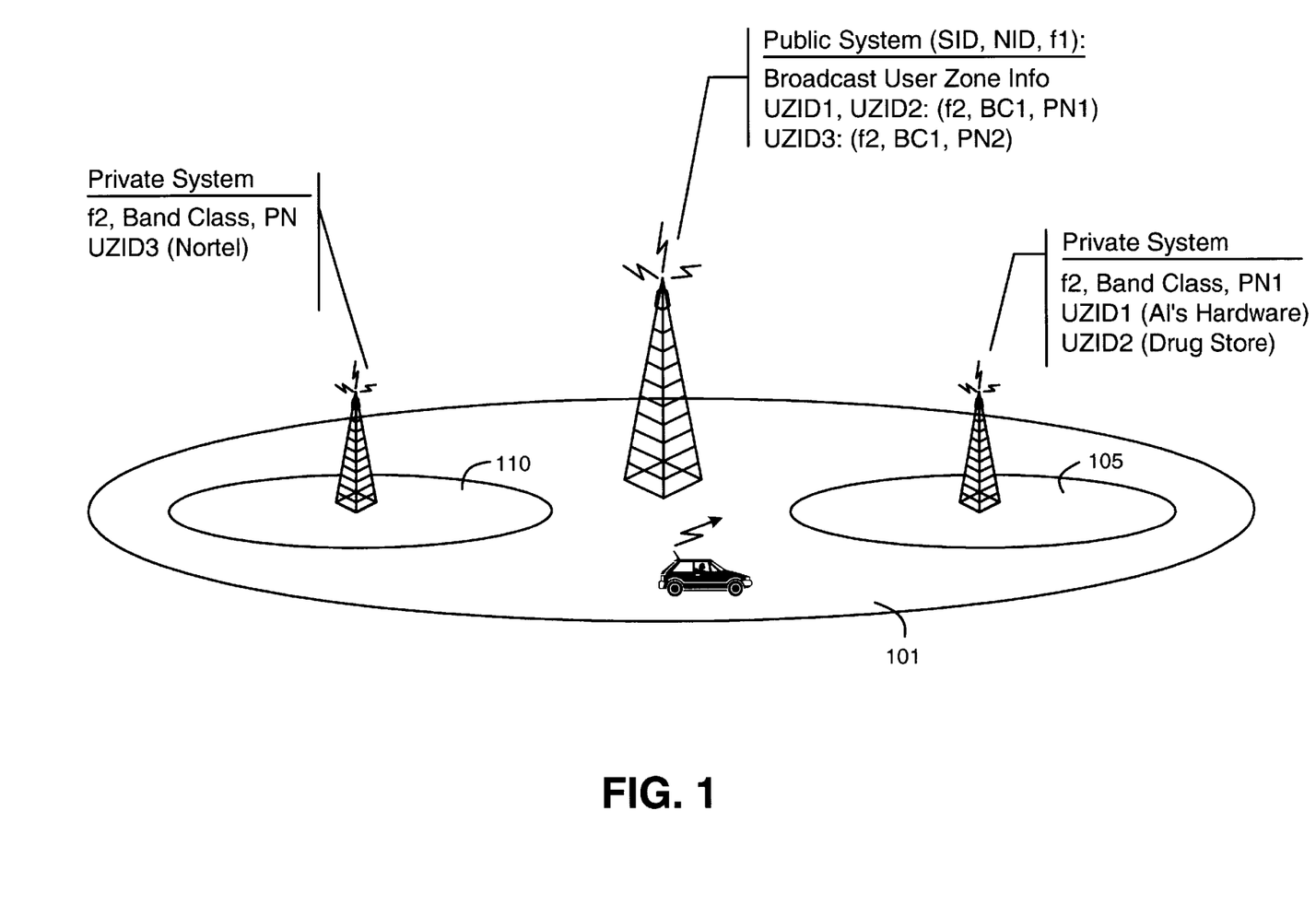
FIG. 1 shows a private carrier embodiment of the present invention using non-autonomous User Zones and an RF dependent search scheme.

FIG. 1 illustrates a private carrier, non-autonomous User Zone wireless communication system using an RF dependent search scheme. This system is comprised of a public system (101) and two private systems (105 and 110). The public system (101) operates on frequency f1 while the two private systems (105 and 110) operate on frequency f2.

In this embodiment, the private systems (105 and 110) are assigned to three separate businesses. One private system (105) comprises two User Zones where each zone is assigned to a department store. The other private system (110) is comprised of a single User Zone assigned to an office building.

The public system's serving base station transmits, on the paging channel, the information required to identify the private systems. In this embodiment, the information includes the User Zone ID number (UZID1, UZID2, and UZID3). Each User Zone ID is assigned to a different business. In this embodiment, UZID1 is assigned to "Al's Hardware Store", UZID2 is assigned to "Drug Store", and UZID3 is assigned to "NORTEL".

Along with the UZID, the serving base station broadcasts the frequency, band class (BC), and PN offset assigned to each private system. For example, private system (105) is assigned to frequency f2, BC1, and PN1. Private system (110) is assigned to frequency f2, BC1, and PN2.

When the radiotelephone powers up or enters the coverage area of a public system base station, it obtains the overlaying private system information off the paging channel. If the user prefers one of the private systems and a UZID match occurs, the radiotelephone attempts to locate the private system radio by tuning to the band class and frequency of the private system.

The radiotelephone then searches for the pilot using the broadcast PN offset assigned to the desired User Zone. If the radiotelephone finds the private system, it displays the corresponding alphanumeric tag (e.g., "Al's Hardware Store", "Drug Store", and "NORTEL") to the user and registers with the private system.

Figure 3:
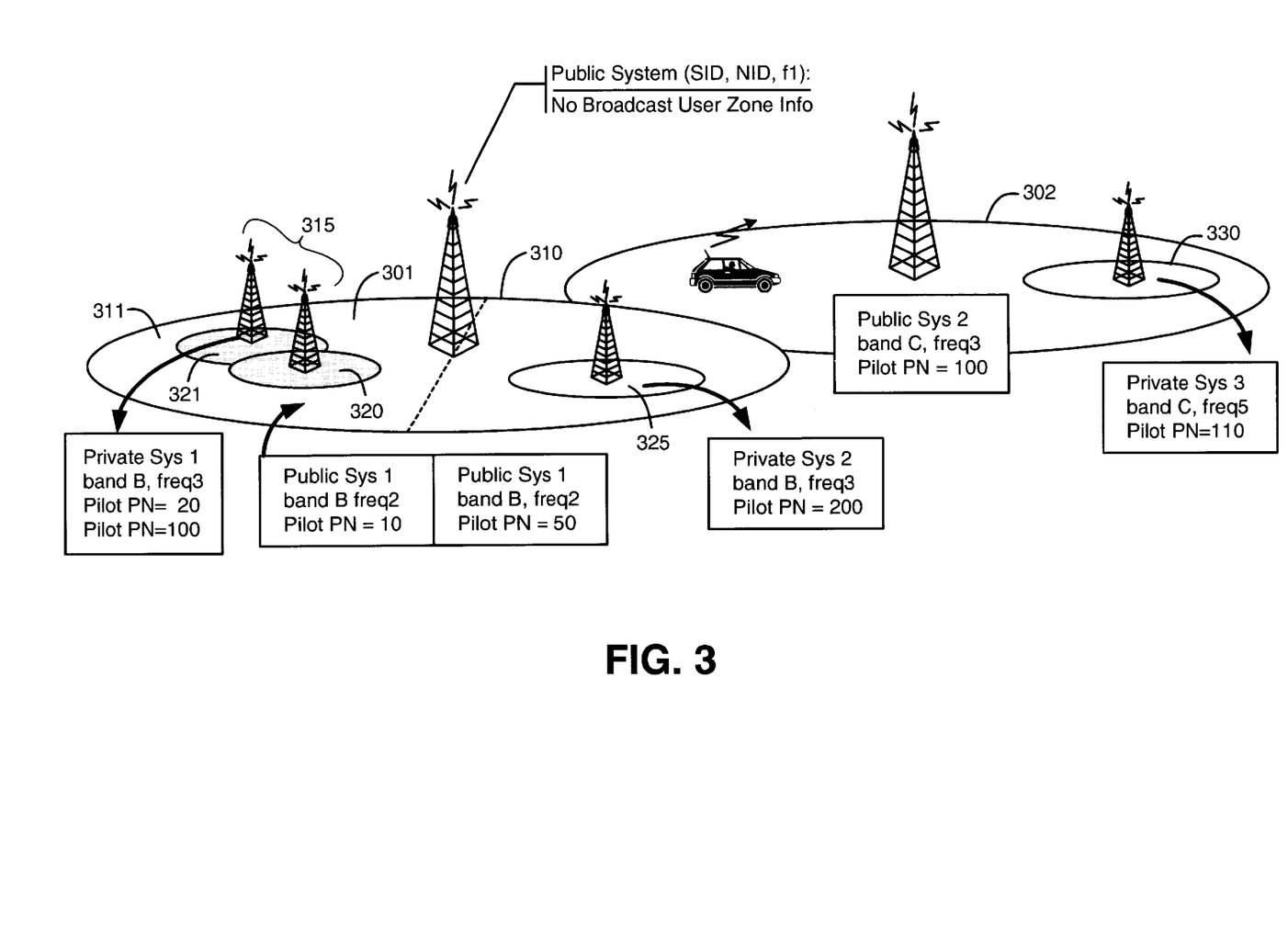
FIG. 3 shows another alternate embodiment of the present invention using autonomous User Zones and an RF dependent search scheme.

FIG. 3 illustrates a private carrier, autonomous User Zone system that uses an RF dependent search scheme. The system of FIG. 3 illustrates two public systems (301 and 302). Public system 1 (301) is split into two sectors (310 and 311). Each sector (310 and 311) of the public system has a different PN offset: 10 (311) and 50 (310).

Public system 1 (301) overlays two private systems (315 and 325). The private systems (315 and 325) operate on the same frequency, f3, and the same band class, BC, but on a different frequency from the overlaying public system (301). The private systems (315 and 325), however, operate on a different frequency from the overlaying public system (301) frequency, f2.

One private system (315) is comprised of two base stations (320 and 321) having different PN offsets 20 (320) and 100 (321). The other private system (325) is comprised of one base station having PN offset 200.

An example of such a system is a multiple floor office tower. Each floor of the tower may have a different base station or multiple base stations, depending on the coverage of each base station and the floor layout. In one embodiment, each base station is assigned a different PN offset. Public system 2 (302) overlays a third private system (330). The underlaying third private system (330) has a different frequency, f5, from the overlaying public system (302). The private system (330) also has a PN offset of 110. In the embodiment of FIG. 3, the base stations of the overlaying public systems do not broadcast the private system information. Radiotelephones subscribed to autonomous private systems use a Private System List or Preferred Roaming List that is stored in the radiotelephone to assist it in finding the autonomous private system.

Figure 4A:
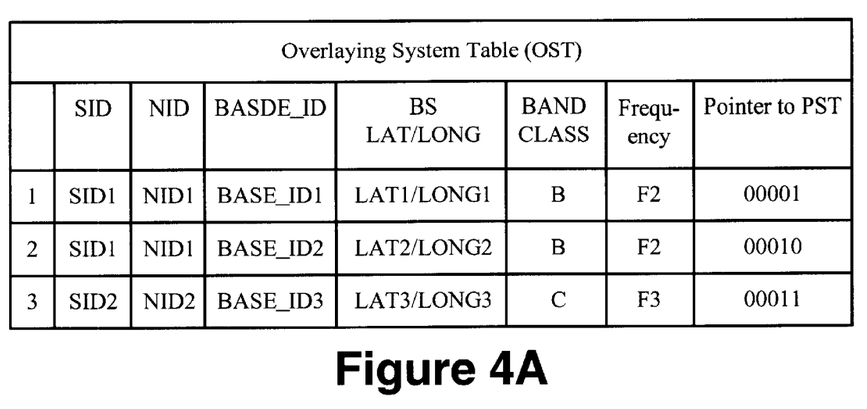
FIGS. 4A–C show an example of a Private System List in accordance with the system of FIG. 3.
Figure 4B:
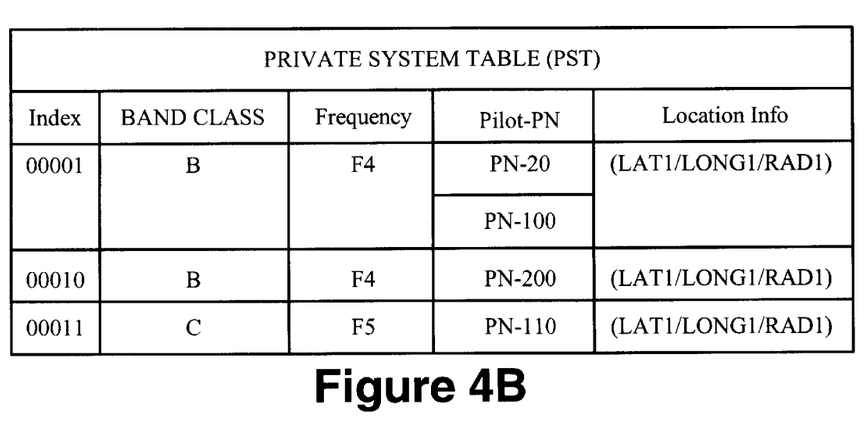
Figure 4C:
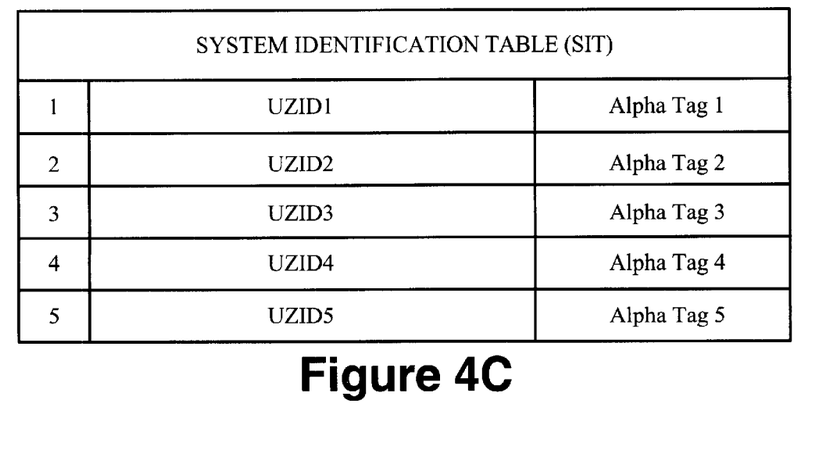

In this embodiment, the Private System List is comprised of three tables, illustrated in FIGS. 4A–C. These tables are the Overlaying System Table, the Private System Table, and the System Identification Table. Alternate embodiments use different quantities of tables containing similar information or any other information required for that particular embodiment.

The Overlaying System Table, illustrated in FIG. 4A, contains the overlaying public system information, such as the system ID (SID), network ID (NID), base station ID (Base_ID), base station longitude and latitude (LAT/LONG), frequency (f), and band class. This table also provides pointers to the Private System Table.

The Private System Table, illustrated in FIG. 4B, holds the band class, frequency, and pilot PN offsets of the autonomous private radio system. The PN offset enables the radiotelephone to begin searching for the private system. The Private System Table may also hold private system location determination parameters.

The System Identification Table, illustrated in FIG. 4C, holds the User Zone IDs and alphanumeric tags of the private systems.

The radiotelephone determines that it is in the vicinity of the private system of interest when a match occurs between the broadcast public system information and that stored in the overlaying system table. If this occurs, the radiotelephone may start to acquire the private system using parameters specified in the private system table. The radiotelephone stays in the private system and gets service when the acquisition is successful. If the radiotelephone fails to acquire any of the private systems, it stays in the current system and starts the acquisition process again at a later time.

Figure 5:
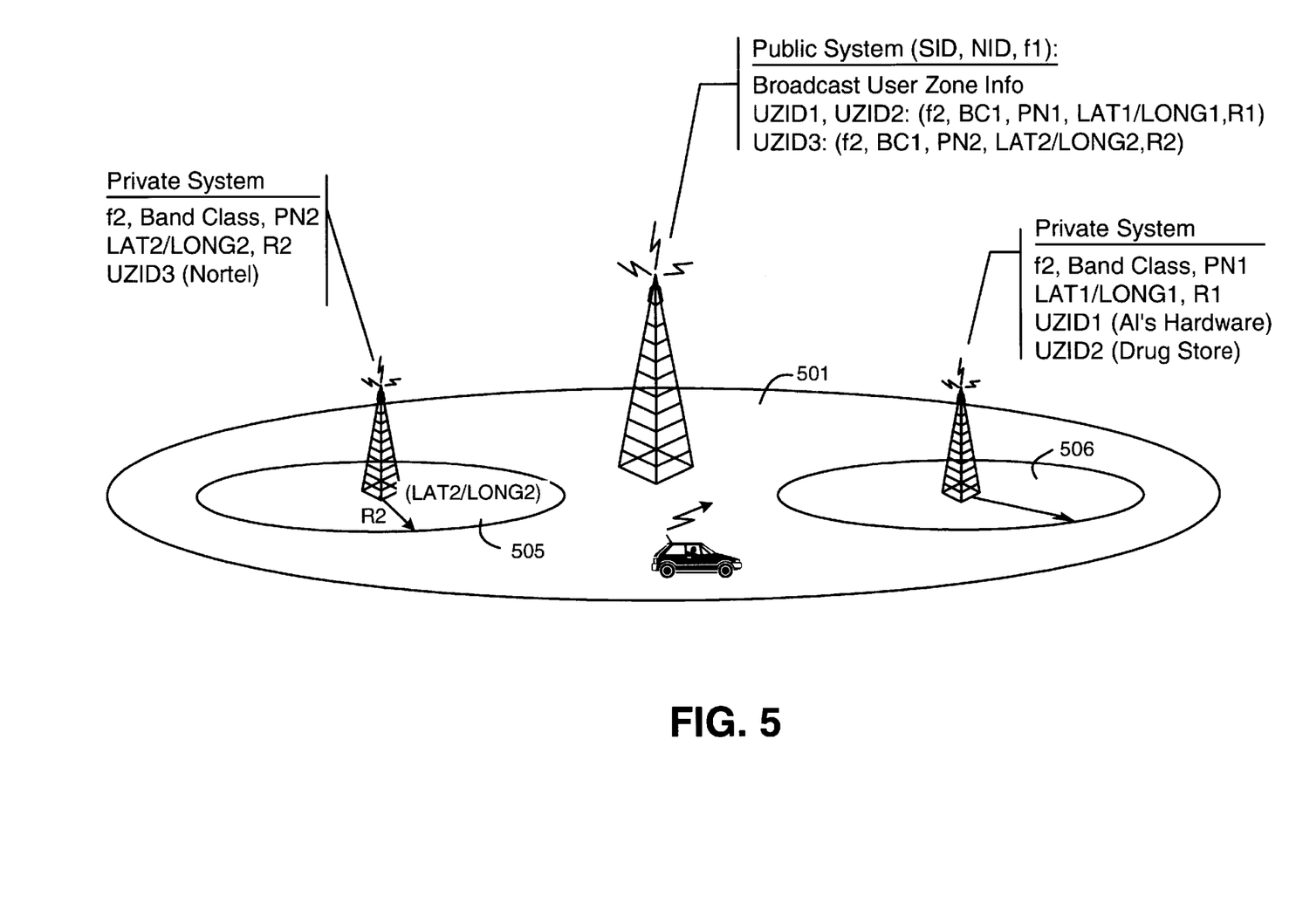
FIG. 5 shows another alternate embodiment system of the present invention using non-autonomous User Zones and a location dependent search scheme.

FIG. 5 illustrates a private carrier, non-autonomous User Zone system that uses a location dependent search scheme. In this embodiment, multiple User Zone IDs are broadcast on the paging channel to identify the private systems supported by the serving base station. Additionally, the serving base station broadcasts the appropriate frequency, band class, PN offset, location of the supported private systems in degrees of latitude and longitude, and the radius of the private systems. In alternate embodiments, other private system boundary specification parameters can be broadcast.

The system illustrated in FIG. 5 is comprised of one public system (501) that overlays two private systems (505 and 506). One of the private systems (506) comprises two User Zones that are assigned UZID1 and UZID2. This private system (506) operates on frequency f2, different from the overlaying public system (501), and assigned PN offset PN1.

The other private system (505) is comprised of a single User Zone that is assigned UZID3. Similar to the other private system (506), this private system (505) also operates on frequency f2, different from the overlaying public system (501), and assigned PN offset PN2.

When the radiotelephone enters the coverage area of the public system's (501) base station, it obtains the private system information off the paging channel. If a User Zone ID match occurs with an authorized User Zone ID stored in the radiotelephone and the radiotelephone is location technology capable, the radiotelephone attempts to locate the particular private User Zone (505 or 506). This is accomplished by using the location information parameters of the User Zone that were transmitted by the serving base station.

If the radiotelephone locates the private system (505 or 506), it may start to acquire the private system by tuning to the frequency carrier of that private system and searching for the associated pilot. If the radiotelephone successfully finds the pilot, the alphanumeric tag of the User Zone supported by that private system is displayed on the radiotelephone's display and the radiotelephone registers with the private system (505 or 506). As in previously described embodiments, the alphanumeric tag is a description of the User Zone such as "NORTEL" (505), "Al's Hardware Store" (506), or "Drug Store" (506). If the radiotelephone fails to acquire the located private system, it may stay in the current system and start the acquisition process again at a later time.

Figure 6:
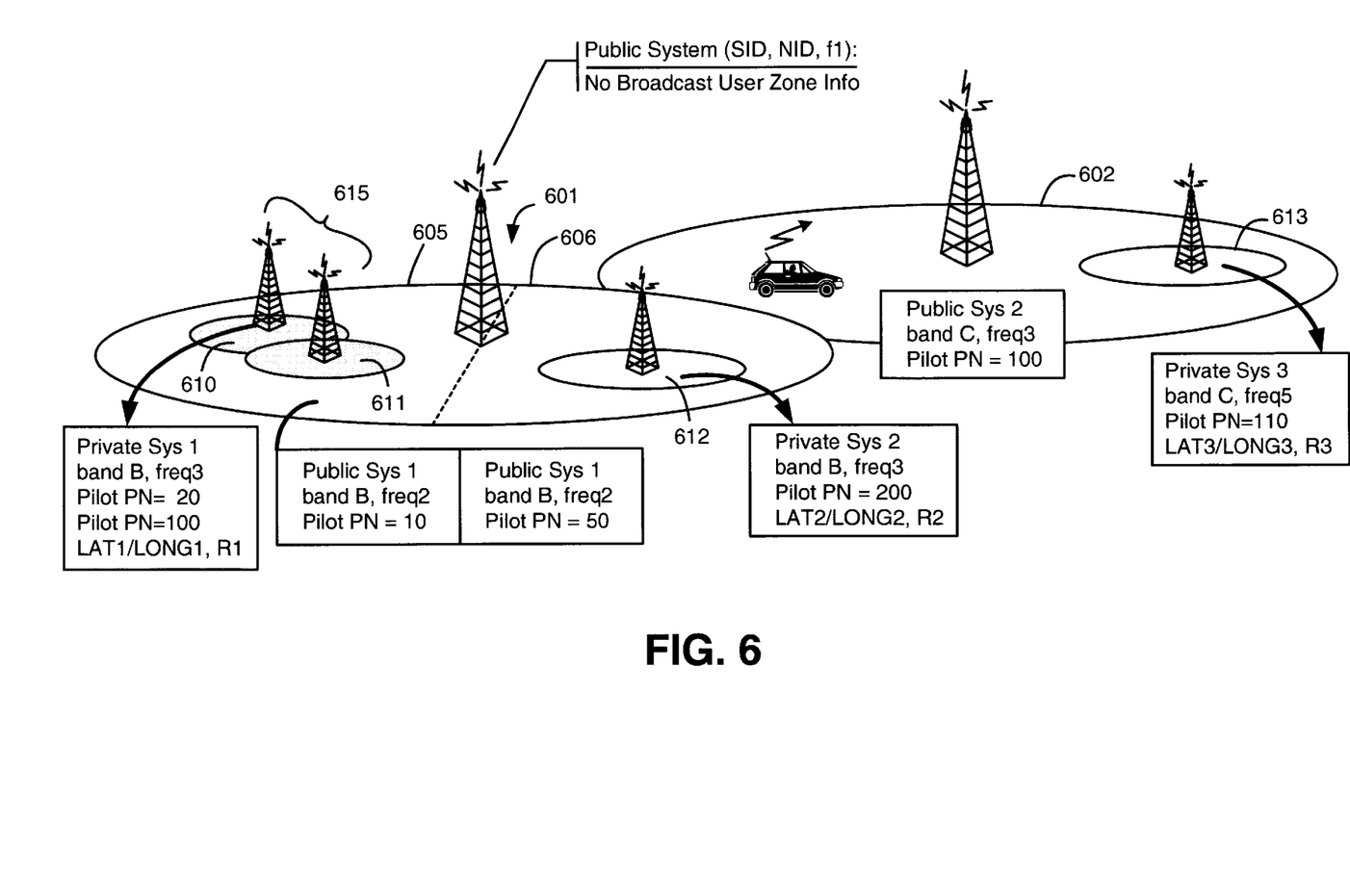
FIG. 6 shows another alternate embodiment of the present invention using autonomous User Zones and a location dependent search scheme.

FIG. 6 illustrates a wireless communication system with private carrier, autonomous User Zones. This embodiment uses a location dependent search scheme.

The system of FIG. 6 illustrates two public systems (601 and 602). Public system 1 (601) operates on one frequency, f2, but is split into two sectors (605 and 606) that use different PN offsets, 10 (605) and 50 (606). The entire public system 1 (601) operates in band class B.

Public system 1 (601) overlays two private system (615 and 612). Private system 1 (615) operates on a separate frequency, f3, and is comprised of two base stations (610 and 611) that are assigned PN offsets: PN=20 and 100. Private system 2 (612) operates on the same frequency, f3, but with a PN offset of 200.

Public system 2 (602) operates on frequency f4 and is assigned PN offset 100. This system (602) overlays one private system (625) that operates on frequency f5 and is assigned PN offset 110.

In this embodiments all of the private systems (615, 612, and 625) have associated latitude and longitude coordinates with a radius of the private system's coverage. In alternate embodiments, other private system boundary specification parameters can be used.

As in the autonomous User Zones of FIG. 3, the serving base station of the overlaying public system does not broadcast the private system information of the embodiment of FIG. 6. The Private System List or preferred roaming list that is stored in the radiotelephone assists the radiotelephone in finding the autonomous private User Zones.

For location technology capable radiotelephones, the stored list includes the UZIDs and the associated location information parameters identifying the boundaries of the private systems of interest. These parameters are dependant on the location technology process supported (i.e., GPS, triangulation, or others).

The radiotelephone uses the location information to search for the User Zone of interest. Once the radiotelephone uses the location technology to determine that it is within the boundaries of the User Zone of interest, it tunes to the corresponding frequency and searches for the pilot channel. Once the pilot channel is found, the radiotelephone registers with that private system. In this embodiment, the alphanumeric tag for the private system may be displayed on the radiotelephone's display.

Figure 7:
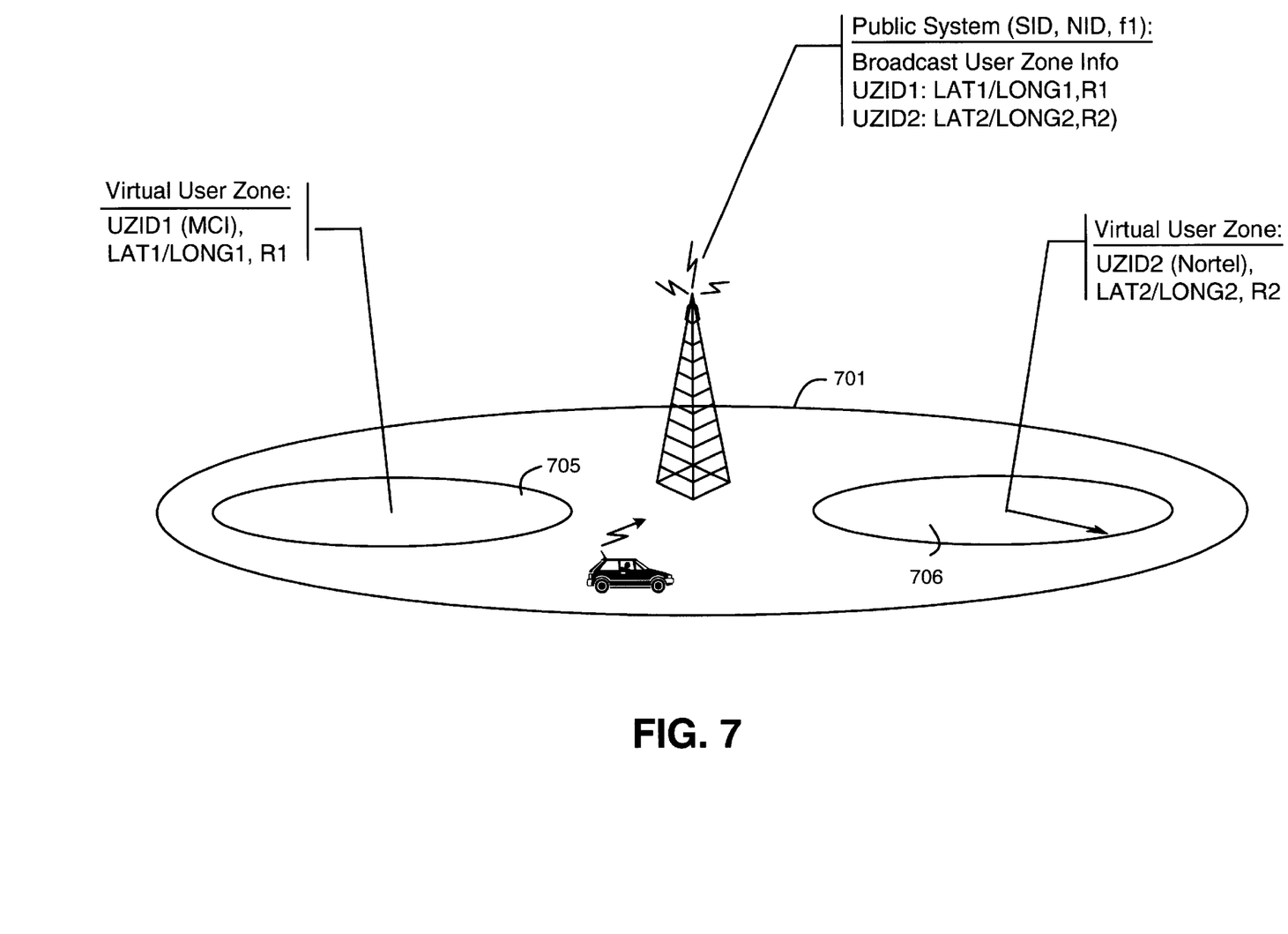
FIG. 7 shows another alternate embodiment of the present invention using a public carrier and virtual User Zones.

FIG. 7 illustrates a public carrier, virtual User Zone embodiment. The User Zones of this embodiment use the carrier and resources of the overlaying public system.

This embodiment is comprised of a public system (701) in which the serving base station broadcasts the User Zone information. This information includes the User Zone ID and the latitude, longitude, and radius of each particular User Zone ID. In alternate embodiments, other User Zone boundary specification parameters can be used.

In the embodiment of FIG. 7, two virtual User Zones (705 and 706) are provided. The latitude/longitude and radius that is broadcast by the serving base station identify the boundaries of these User Zones.

When the radiotelephone powers up or enters the coverage area of a public system base station, it obtains the supported User Zone IDs from the paging channel. If the radiotelephone finds a User Zone ID match with those stored in the radiotelephone, the radiotelephone attempts to locate the User Zone using the broadcast location information parameters.

These parameters, in an alternate embodiment, could have been stored in the radiotelephone's memory along with the User Zone ID. In this embodiment, the serving base station would only broadcast the User Zone IDs of the User Zones within its service area.

If the radiotelephone determines that it is within the boundaries of a particular User Zone (705 or 706), it displays the alphanumeric tag associated with that User Zone (705 or 706). The radiotelephone then registers with the User Zone (705 or 706).

In any of the previously discussed embodiments in which the radiotelephone stores User Zone IDs and information, the radiotelephone can acquire the User Zone IDs or information in multiple ways. These methods include over the air programming, and querying the system for information.

Over the air programming allows an operator to download User Zone ID lists and associated information to the radiotelephone's memory. The downloaded information may be stored permanently or only for a power cycle.

The radiotelephone can also query the system for information about possible service in a User Zone that has been broadcast by the serving base station. These User Zones are not listed in the radiotelephone's memory. In response to the query, the base station identifies the User Zones that are accepting radiotelephone registration and sends all the associated information (UZID, alpha tags, lat./long./radius). The radiotelephone then retains the UZIDs and information in its memory, either through a power cycle or permanently.

Figure 2:
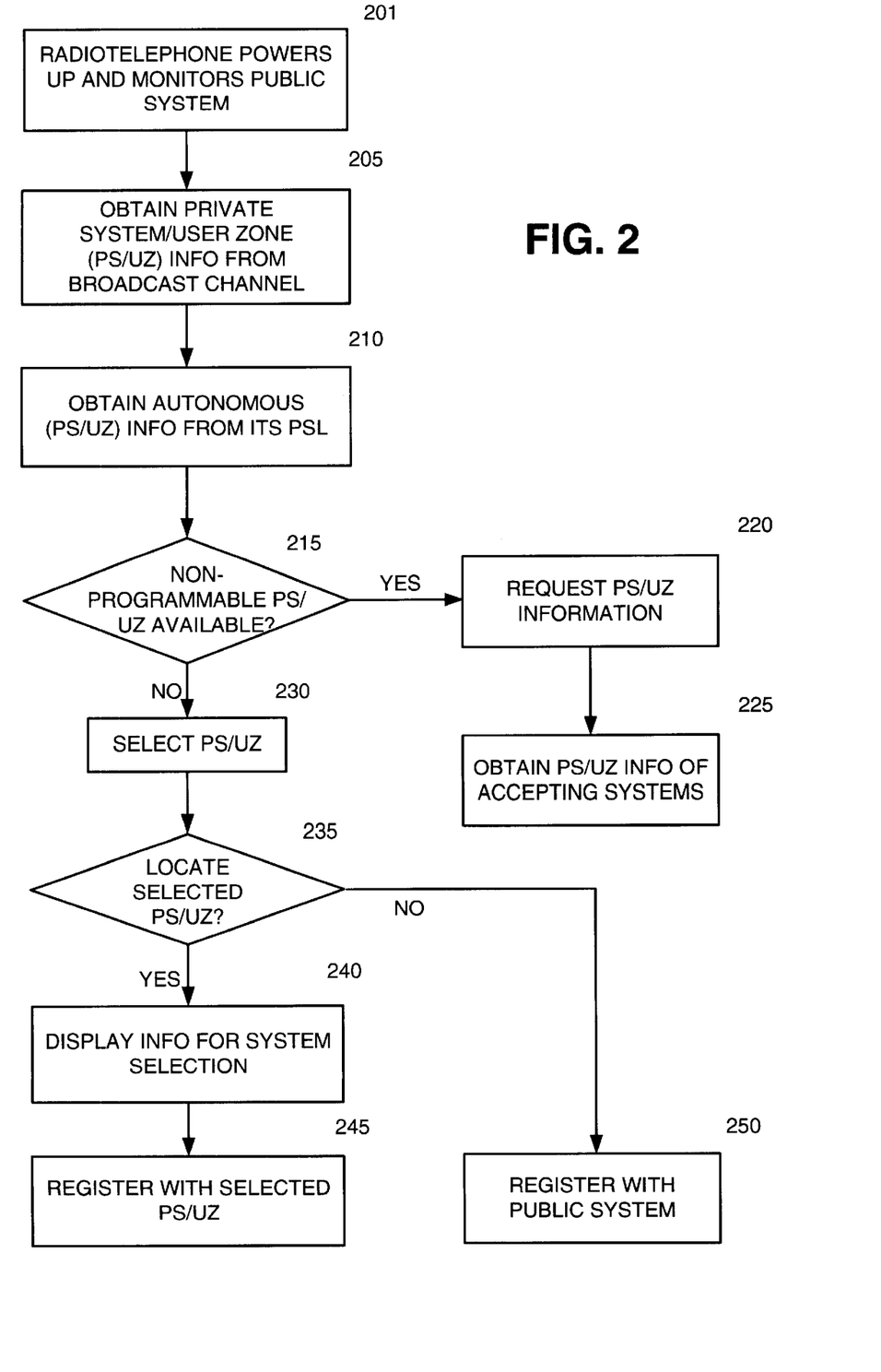
FIG. 2 shows a flowchart of the system selection process of the present invention.

FIG. 2 illustrates the private system selection process of the present invention. The process starts by the radiotelephone powering up and monitoring the public system (step 201). The radiotelephone then obtains the private system/User Zone identification information from the broadcast channel or other channel used to disseminate this information (step 205).

The radiotelephone accesses the system information from the Private System List in memory (step 210). The radiotelephone then attempts to determine if a private system/User Zone, not programmed into memory, is available using the Private System List information (step 215). Depending on the embodiment, the radiotelephone uses either location based technology to determine the local private systems and then performs a search for pilot signals or performs a search for all pilot signals retrieved from memory.

If a system is found, the radiotelephone requests system information from all of the private systems/User Zones (step 220) that were discovered. The radiotelephone then obtains the private system/User Zone information of systems that will accept registration by the radiotelephone (step 225).

If no non-programmed private systems/User Zones are found (step 215), the alphanumeric tags for each system that is available are displayed for the user to choose (step 230) the system/User Zone in which they wish to register. The user can then scroll through the list to select the desired User Zone. Once the user has selected the desired system, the radiotelephone attempts to locate that system (step 235).

If the radiotelephone is not successful in locating the selected system (step 235), the radiotelephone registers with the public system (step 250).

If the selected system is located (step 235), the system information is displayed to allow the user to decide whether to register with that system (step 240). If selected, the radiotelephone then registers with that system (step 245).

In one embodiment of the present invention, the private systems store tables of mobile identification numbers for radiotelephones to which the systems will allow access. These tables can be stored at the base station or other locations within the private system. The private systems, in an alternate embodiment, store tables of mobile identification numbers for radiotelephones to which the systems will not allow access.

Figure 8:
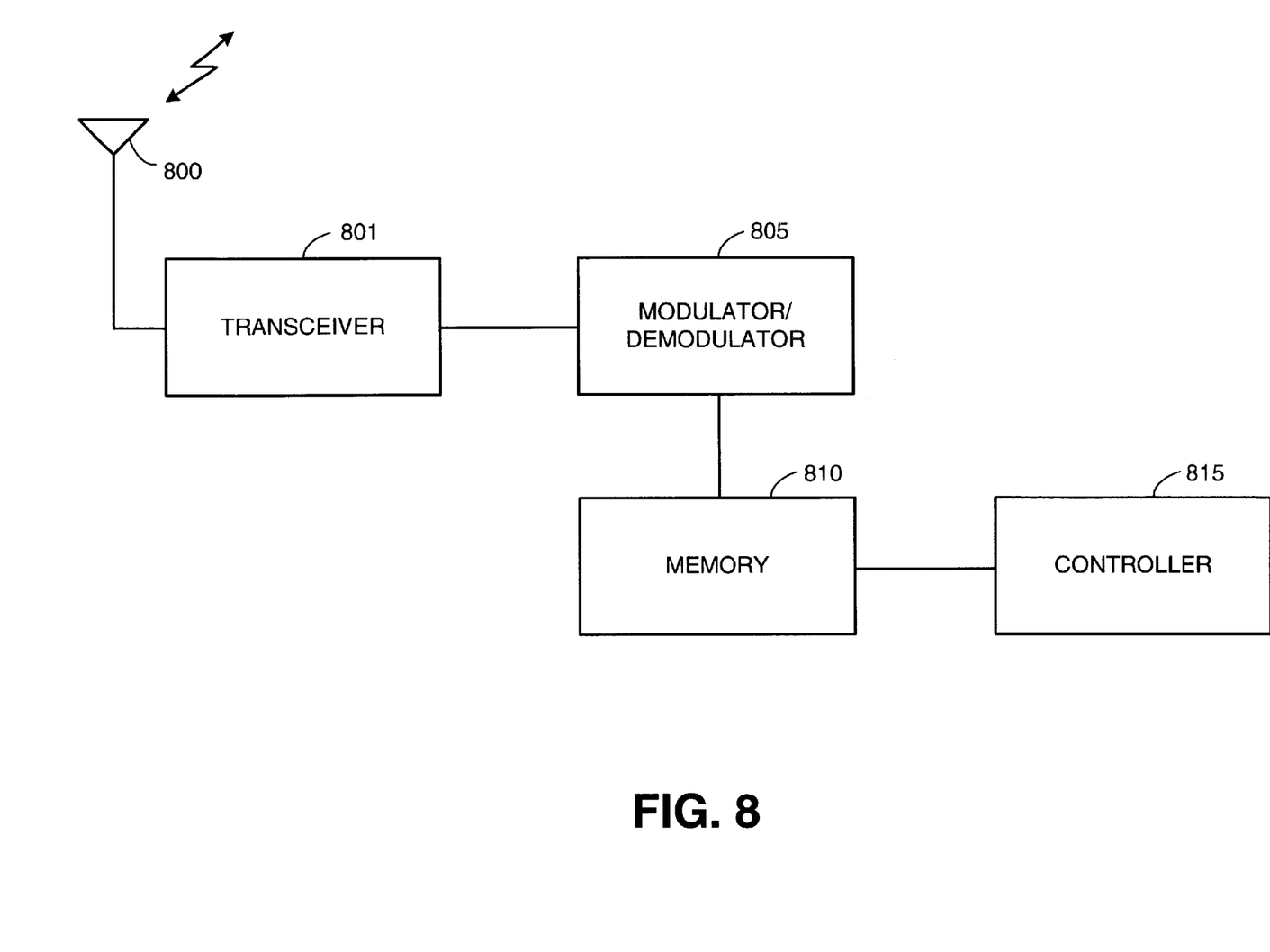
FIG. 8 shows a radiotelephone of the present invention.

FIG. 8 illustrates a block diagram of the radiotelephone that operates in the wireless communication systems of the present invention. The radiotelephone is comprised of a controller (815) for controlling the radiotelephone. Memory (810) is used to store the radiotelephone information as well as the public and private system information. A transceiver (801) transmits modulated (805) information over the channel and receives information from the channel to be demodulated (805). The antenna (800) radiates and receives the radiotelephone signals.

In summary, the CDMA based systems of the present invention provide a complete solution for supporting private, semi-private, and residential systems without interfering with the overlaying public system. By creating private User Zone systems that underlay a public system, a set of features and services can be offered to subscribers that have subscribed to the User Zones. This is accomplished without interfering with the overlaying public system.

We claim:

1. A method for radiotelephone operation in a wireless communications system using CDMA air interface, the wireless communications system comprising a public system and a plurality of underlaid private systems, the radiotelephone having a display and memory that stores private systems information, the method comprising the steps of:

the public system broadcasting private systems information on a predetermined paging channel;

the radiotelephone monitoring the predetermined paging channel; and the radiotelephone locating and acquiring a subset of private systems of the plurality of underlaid private systems in response to the broadcast private systems information and the stored private systems information by:

matching broadcast user zone identifications supported by the plurality of underlaid private systems to stored user zone identifications in the radiotelephone;

if a single stored user zone identification is matched, attempting to access a corresponding private system of the plurality of underlaid private systems;

if multiple stored user zone identifications are matched, using a predetermined priority list to select and attempt access a corresponding private system of the plurality of underlaid private systems; and if an initial access of the corresponding private system is not successful, attempting to access another private system supporting the user zone identification.

2. A method for radiotelephone operation in a wireless communication system using CDMA air interface, the wireless communication system including a public system and a plurality of underlaid private systems, the radiotelephone having a display and memory, the method comprising:

receiving broadcast information from the public system;

attempting to retrieve private system/user zone information from the broadcast information;

if the broadcast information includes private system/user zone, storing the private system/user zone information in memory;

attempting to retrieve additional private system/user zone information from memory;

compiling all retrieved private system/user zone information;

determining at least one private system of the plurality of underlaid private systems to access based upon the all retrieved private system/user zone information by matching broadcast user zone identifications supported by the plurality of underlaid private systems to user zone identifications stored in the radiotelephone;

if a single stored user zone identification is matched, selecting and attempting to access a corresponding first private system of the plurality of underlaid private systems;

if multiple stored user zone identifications are matched, using a predetermined priority list to select, and attempt to access a corresponding first private system of the plurality of underlaid private systems; and if an initial access of the first private system is not successful, selecting and attempting to access a second private system corresponding to a matched user zone identification.

3. The method of claim 2, further comprising if attempting to register with the first private system is unsuccessful, attempting to register with the public system.

4. The method of claim 2, further comprising:

displaying at least one matched user zone identification to a user of the radiotelephone on the display;

receiving instructions from the user regarding private system selection; and based upon the instructions from the user, determining the first private system.

5. The method of claim 2, wherein the broadcast information from the public system does not include user zone identifications.

6. The method of claim 2, wherein:

the public system and the plurality of underlaid private systems share a common carrier frequency; and each of the public system and the plurality of underlaid private systems has a unique respective pseudo-noise offset.

7. The method of claim 2, wherein:

the public system operates on a first carrier frequency;

the plurality of underlaid private systems operate on a second carrier frequency; and each of the plurality of underlaid private systems has a unique respective pseudo-noise offset.

8. The method of claim 2, wherein each of the plurality of underlaid private systems corresponds to a respective premises.

9. A radiotelephone that operates in a wireless communication system using CDMA air interface, the wireless communication system including a public system and a plurality of underlaid private systems, the radiotelephone having a display and memory, the radio telephone comprising:

means for receiving broadcast information from the public system;

means for attempting to retrieve private system/user zone information from the broadcast information;

means for, if the broadcast information includes private system/user zone, storing the private system/user zone information in memory;

means for attempting to retrieve additional private system/user zone information from memory;

means for compiling all retrieved private system/user zone information;

means for determining at least one private system of the plurality of underlaid private systems to access based upon the all retrieved private system/user zone information by matching broadcast user zone identifications supported by the plurality of underlaid private systems to user zone identifications stored in the radiotelephone;

means for, if a single stored user zone identification is matched, selecting and attempting to access a corresponding first private system of the plurality of underlaid private systems;

means for, if multiple stored user zone identifications are matched, using a predetermined priority list to select, and attempt to access a corresponding first private system of the plurality of underlaid private systems; and means for, if an initial access of the first private system is not successful, selecting and attempting to access a second private system corresponding to a matched user zone identification.

10. The radiotelephone of claim 9, further comprising:

means for, if attempting to register with the first private system is unsuccessful, attempting to register with the public system.

11. The radiotelephone of claim 9, further comprising:

means for displaying at least one matched user zone identification to a user of the radiotelephone on the display;

means for receiving instructions from the user regarding private system selection; and means for, based upon the instructions from the user, determining the first private system.

12. The radiotelephone of claim 9, wherein the broadcast information from the public system does not include user zone identifications.

13. The radiotelephone of claim 9, wherein:

the public system and the plurality of underlaid private systems share a common carrier frequency; and each of the public system and the plurality of underlaid private systems has a unique respective pseudo-noise offset.

14. The radiotelephone of claim 9, wherein:

the public system operates on a first carrier frequency;

the plurality of underlaid private systems operate on a second carrier frequency; and each of the plurality of underlaid private systems has a unique respective pseudo-noise offset.

15. The radiotelephone of claim 9, wherein each of the plurality of underlaid private systems corresponds to a respective premises.

* * * * *